United States Patent Office 3,329,908
Patented July 4, 1967

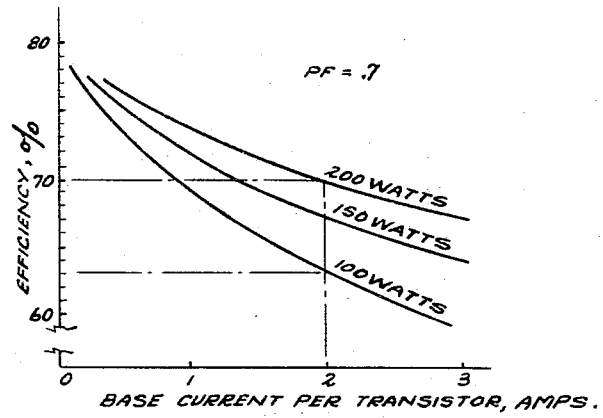
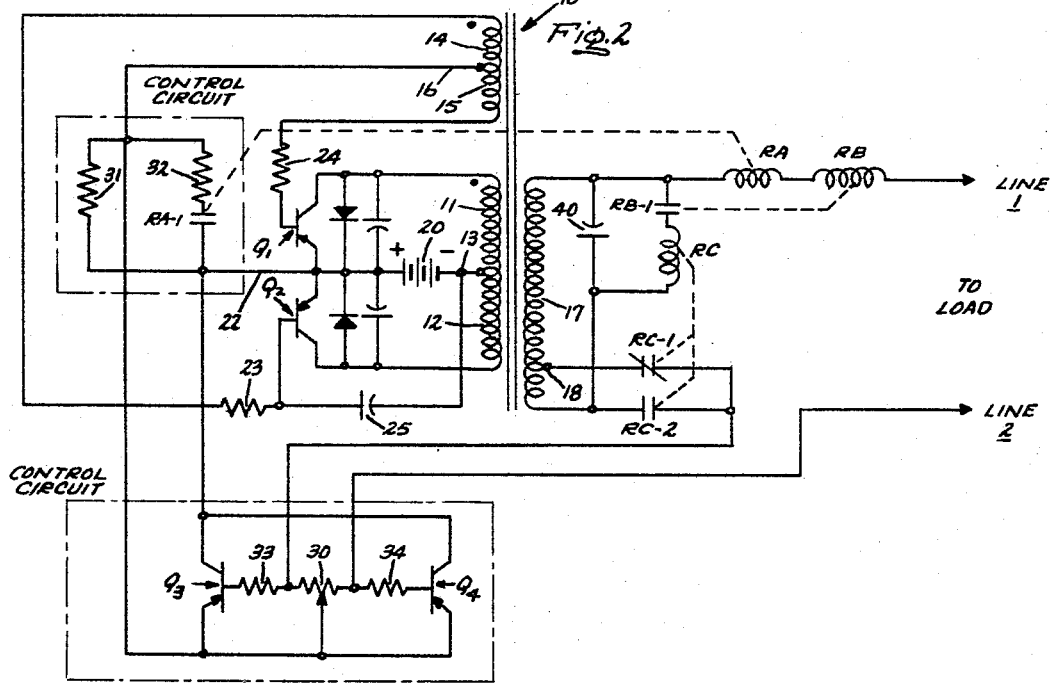
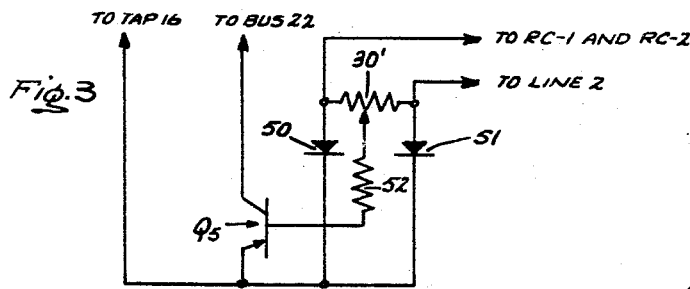
Inventor:
Harold B. Harms,
by James G. Williams
Attorney.

3,329,908
TRANSISTOR INVERTER WITH AN IMPROVED
BASE CURRENT CONTROLLING CIRCUIT
Harold B. Harms, Fort Wayne, Ind., assignor to General
Electric Company, a corporation of New York
Filed Dec. 7, 1965, Ser. No. 512,060
6 Claims. (Cl. 331—113)

ABSTRACT OF THE DISCLOSURE

A variable impedance control circuit for use in a transistor inverter for regulating the output of the inverter in response to load conditions. The control circuit includes an impedance element in normally open circuit condition in series between a feedback winding and the emitter-base path of the inverter transistors and in parallel with a second impedance element. A relay in the output of the inverter circuit, responsive to load conditions is connected to switch means in the normally open circuit. A current sensing resistor and a semiconductor device are connected in parallel with the second impedance element and in series between the emitter-base paths of the transistors and the feedback winding, with the current sensing resistor also being in series relation between the load and transformer secondary for sensing A.C. load current.

The invention relates to transistor inverters of the saturable core type, and particularly to an improved base current control circuit for such inverters.

Inverters are commonly used to convert direct current, such as provided by a relatively low voltage battery, to alternating current, such as 115 volts, 60 cycles. One such inverter uses a pair of semiconductor devices and a source of direct current coupled to a primary winding on a saturable or nonlinear magnetic core. A feedback winding on the core is coupled to the control electrodes of the semiconductor devices to cause the two semiconductor devices to alternately conduct. Alternating current is derived by an output winding on the magnetic core. Such an inverter performs satisfactorily in many applications. But if the inverter must operate continually under various conditions between no load and heavy starting loads, and if power transistors are used for the semiconductor devices, then the amount of base current supplied to each transistor of previous inverters represents a compromise. This compromise lies between the maximum base current needed for the inverter to supply the maximum load current on one hand, and the minimum base current needed for the inverter to continue operating under a no-load condition on the other hand. If the maximum base current is supplied, then the inverter requires a large amount of power, much of which is wasted under a no-load condition. If some reduced base current is supplied, then the inverter cannot supply all of the load current under an increased or a maximum load condition. As indicated, the amount of base current for previous inverters represents a compromise, usually at a value that supplies a reasonable maximum load current. This value of base current is wasteful of power under a no-load condition, and does not permit the inverter to supply the needed current under an abnormal load condition, such as when a motor is started.

Accordingly, an object of the invention is to provide an improved inverter.

Another object of the invention is to provide an improved transistor inverter that operates efficiently under various load conditions.

Another object of the invention is to provide a base control circuit for transistors operated in an inverter having a saturable magnetic core.

Another object of the invention is to provide an improved magnetic core inverter having transistors with a circuit for controlling the transistor base current as a function of load condition.

Briefly, these and other objects are achieved in an inverter having a source of direct current, a pair of transistors, and a saturable or nonlinear magnetic core. A primary winding is coupled to the magnetic core and connected between the source of direct current and the emitter-collector paths of the transistors. A feedback winding is coupled to the core, and respectively connected to the base-emitter paths of the transistors. The windings are poled relative to each other so that when the core magnetization becomes nonlinear or saturated in one direction by conduction of one transistor, the other transistor is rendered conducting and the one transistor is turned off to magnetize the core in the opposite direction. Suitable output means, such as an output winding, are coupled to the core to produce alternating current in response to the alternate conduction of the two transistors. In accordance with the invention, a variable impedance control circuit is placed in series with the feedback winding and the transistor base-emitter path. Load current sensing means are connected to the output means and to the variable impedance circuit to control the base current supplied to the transistors, and hence the output current supplied by the inverter. Under a no-load condition, the base current is reduced to a value that keeps the inverter operating but that requires minimum current; and under an increased load condition, the base current is increased so that the inverter supplies the increased load current; and under an intermediate load condition, the base current is adjusted to a value so that the inverter supplies the intermediate load current.

The invention is particularly pointed out in the claims. The invention may be better understood from the following description given in connection with the accompanying drawing, in which:

FIGURE 1 shows curves illustrating how the efficiency of an inverter varies with base current for three load conditions;

FIGURE 2 shows a schematic diagram of an inverter incorporating one preferred embodiment of a control circuit in accordance with the invention; and FIGURE 3 shows one modification of a portion of the control circuit of FIGURE 2.

The control circuit of the invention was intended to be used with an inverter that converts six volts direct current to 115 volts, 60 cycles alternating current. While the alternating current so supplied can operate a number of devices, one specific device to be operated is a one-twelfth ($1/12$) horsepower compressor motor for a refrigerator. When this motor is first started, it requires approximately 7 amperes at 115 volts, 60 cycles for approximately 0.2 second. After this, the motor requires approximately 2.7 amperes at 115 volts, 60 cycles. As the motor continues to operate, its required current decreases because the compressor load decreases. Finally, when the thermostatic control in the refrigerator operates in response to sufficient cold, the motor current becomes zero. Thus, the inverter must supply current between zero and 7 amperes. Other load conditions and direct current voltages may be present.

FIGURE 1 shows curves illustrating how the percent efficiency of an inverter varies with transistor base current for a load power factor of 0.7, and loads of 200 watts, 150 watts, and 100 watts. For a fixed base current of 2 amperes, for example, the efficiency drops from approximately 70 percent at a 200 watt load to approximately 63 percent at a 100 watt load. Thus, if the base current is fixed and the demanded load decreases, the inverter efficiency also decreases. Or expressed in another way, the efficiency of transistor inverters may be improved by the base current being set at the value needed to supply the load current demanded.

*Circuit description*

FIGURE 2 shows an inverter circuit incorporating the control circuit of the invention. The control circuit (enclosed in the dashed and dotted line rectangles) permits the base current of the transistors in a magnetic core type inverter to be varied in accordance with the load conditions. The inverter shown in FIGURE 2 comprises a saturable or nonlinear core transformer 10 having two primary windings 11, 12 (actually a single winding with a center tap 13) and two feedback windings 14, 15 (actually a single winding with a center tap 16). These windings are coupled to the core as indicated by the conventional polarity dots. An output winding 17 having a tap 18 to provide a reduced voltage is also coupled to the transformer core. A direct current source 20, represented by a battery, has its negative terminal connected to the primary winding center tap 13. Two PNP type transistors $Q_1$ and $Q_2$ are provided, and have their emitters connected to a common bus 22 which is connected to the positive terminal of the source 20. The transistor collectors are connected to the respective ends of the primary windings 11, 12. The transistor bases are connected through respective resistors 23, 24 to the respective ends of the feedback windings 14, 15. The feedback winding center tap 16 is connected to the common bus 22 through the control circuit of the invention to provide a complete circuit for the base-emitter paths of the transistors $Q_1$ and $Q_2$. The control circuit is enclosed by the two dashed and dotted line rectangles as shown in FIGURE 2. The transistors $Q_1$ and $Q_2$ are provided with respective collector-emitter diode rectifiers for providing an inductive current path when the transistors $Q_1$ and $Q_2$ are turned off, and with respective collector-emitter capacitors to reduce transient voltage peaks when the transistors $Q_1$ and $Q_2$ are turned off. A capacitor 25 is coupled between the negative terminal of the direct current source 20 and the base of either of the transistors, in this case the transistor $Q_2$, for the purpose of insuring that the inverter starts under various load conditions.

In the inverter circuit as thus far described, if it is assumed that the feedback winding center tap 16 is connected to the common bus 22, one of the transistors, say the transistor $Q_1$, begins to conduct current. Current then flows from the positive terminal of the direct current source 20, through the emitter-collector path of the transistor $Q_1$, through the primary winding 11 from the dotted end to the undotted end, and back to the negative terminal of the source 20. This induces a voltage in the feedback windings 14, 15 which tends to turn the transistor $Q_1$ on more and which tends to turn the transistor $Q_2$ off. Thereafter, saturation or nonlinear current results, after which, the flux in the transformer 10 reverses so as to switch conduction from the transistor $Q_1$ to the transistor $Q_2$. At this point, current flows from the positive terminal of the source 20, through the emitter-collector path of the transistor $Q_2$, through the primary winding 12 from the undotted end to the dotted end, and back to the negative terminal of the source 20. The feedback windings 14, 15 tend to turn the transistor $Q_2$ on more and tend to turn the transistor $Q_1$ off. Subsequently, the core of the transistor 10 saturates or becomes nonlinear and the circuit switches so that the transistor $Q_1$ is conducting and the transistor $Q_2$ is turned off. The frequency of this switching depends, among other things, upon the things, upon the volt-second characteristic of the transformer 10.

As the current in the primary windings 11, 12 switches as described in the previous paragraph, an alternating voltage is produced. This voltage may be derived in various ways, such as by the secondary or output winding 17. The voltage is supplied as alternating current to any suitable load. The output winding 17 is connected to lines 1 and 2 (for connection to the alternating current load) through two relay windings RA and RB on one side; and through either relay contacts RC–1 or contacts RC–2, and a current sensing resistor 30 in the control circuit on theother side. The relay RA has normally open associated contacts RA–1 in the control circuit as indicated by the dashed lines. The relay RB has associated normally open contacts RB–1 (indicated by dashed lines) which are connected in series with another relay RC across the output winding 17. The relay RC has a set of normally closed contacts RC–1, and a set of normally open contacts RC–2 (indicated by the dashed lines). The normally closed contacts RC–1 connect the reduced voltage tap 18 to the line 2, and the normally open contacts RC–2 connect the full voltage of the output winding 17 to the line 2 when the relay RC is energized to close the contacts RC–2. A capacitor 40 is coupled across the output winding 17 for the purpose of reducing transient voltage peaks during switching. And, filtering may be provided if desired.

In the circuit just described, the base current is supplied by the voltage induced in the feedback windings 14, 15. This base current determines the emitter-collector current supplied by the transistors $Q_1$ and $Q_2$, and hence determines the output current supplied to the load. If the load demands more current, but if the transistors are carrying a saturated emitter-collector current for the amount of base current supplied, the increased load current demand cannot be met. This is because for a saturated emitter-collector current, any increase in the emitter-collector current increases the emitter-collector voltage drop. Thus, there is a reduction in current supplied to the primary windings 11, 12, and the transformer 10 tends to switch at an earlier point in time. However, the main disadvantage of a fixed transistor base current is that increased load conditions cannot be supplied, and decreased load conditions waste base current. Hence, it is desirable that the base current be variable, and further that the base current be variable in accordance with the load current being demanded. The control circuit of the invention as shown in FIGURE 2 provides this variable control.

In accordance with the invention, the control circuit shown in two dashed and dotted line rectangles) provides a variable impedance between the feedback winding center tap 16 and the common emitter bus 22. This control circuit comprises a first fixed resistor 31, and a second fixed resistor 32 that is switched in and out of the control circuit by the normally open relay contacts RA–1. The operation of the relays and contacts will be subsequently explained. The control circuit also comprises a variable impedance which is provided by the conductive state of two control transistors $Q_3$ and $Q_4$ of the PNP type. The emitter-collector paths of the two control transistors $Q_3$ and $Q_4$ are connected between the center tap 16 and the common bus 22 to carry current from the center tap 16 to the common bus 22. The bases of the two control transistors $Q_3$ and $Q_4$ are connected through respective resistors 33, 34 to the current sensing resistor 30. As mentioned, the voltage sensing resistor 30 is connected in series with the output line 2. The voltage sensing resistor 30 is provided with an adjustable tap connected to the emitters to provide a balanced base-emitter current path for the control transistors $Q_3$ and $Q_4$. As will be explained, the control transistors $Q_3$ and $Q_4$ are rendered more or less conducting in accordance with or as a function of the output current through the current sensing resistor 30, and thereby provide a continuously variable impedance between the center tap 16 and the common bus 22.

Circuit operation

With the source 20 connected to the inverter under no load, the center tap 16 is connected to the common bus 22 only through the resistor 31. The resistor 31 is selected so that the minimum needed base current is provided to the transistors $Q_1$ and $Q_2$ for this no-load condition. Thus, a minimum current drain is made on the source 20. If a relatively small amount of load current is drawn, a voltage will be developed across the current sensing resistor 30. This causes the transistors $Q_3$ and $Q_4$ to conduct emitter-collector current (from the center tap 16 to the emitters of the transistors $Q_1$ and $Q_2$, and through the transistors $Q_1$ and $Q_2$ back to the feedback windings 14, 15) proportional to or that varies as a function of the load current being drawn. Thus, the control transistors $Q_3$ and $Q_4$ provide the needed additional base current to the inverter transistors $Q_1$ and $Q_2$ for this load condition. Under this load condition, it is also assumed that the lower voltage provided by the tap 18 is also supplied to the load.

If the load current demand is increased some predetermined amount that exceeds the pick up current of the relay RA, the relay RA closes its associated contacts RA-1. This places the resistor 32 (which has a relatively low resistance) between the center tap 16 and the common bus 22 so that full base current is provided to the transistors $Q_1$ and $Q_2$ to meet this load condition. Also under this or any predetermined load condition, the relay RB may pick up so as to close its contacts RB-1. This energizes the relay RC which, in turn, causes the contacts RC-1 to open and the contacts RC-2 to close. Thus, the full voltage of the output winding 17 may also be supplied to the load to meet a heavy load current demand such as the refrigerator compressor motor starting.

After the initial load condition, such as the motor starting, the current usually decreases, and at some predetermined level, the relay windings RA and RB may drop out and permit their respective contacts RA-1 and RB-1 to open. This removes the low magnitude resistor 32 from the control circuit, and also deenergizes the relay RC. Deenergization of the relay RC switches the contacts RC-1 and RC-2 back to the closed and open condition respectively so that the lower voltage at the tap 18 is provided to the load. However, it will be seen that the current sensing resistor 30 is on the load side of the contacts RC-1 and RC-2 and the control transistors $Q_3$ and $Q_4$ continue to function under both voltage conditions. Thus, the control circuit in accordance with the invention provides either fixed base current control steps with the relays RA and RB, and provides a continuous base current control with the current sensing resistor 30 and the control transistors $Q_3$ and $Q_4$. It is to be understood that either the stepped or incremental base current changes by relays, or the continuous base current changes by the transistors, or by a combination as shown and described may be provided. Where relays are utilized for this control, their operation may be in any sequence and with any pick up and drop out levels. Where relays are used in conjunction with the control transistors $Q_3$ and $Q_4$, their operation may be at any current levels with respect to the control provided by the transistors $Q_3$ and $Q_4$.

FIGURE 3 shows a modification which may be used in place of part of the control transistor arrangement shown in FIGURE 2. The modification of FIGURE 3 may be substituted for the control transistors $Q_3$ and $Q_4$, and the resistors 30, 33, 34. The modification of FIGURE 3 utilizes two diode rectifiers 50, 51, a current sensing resistor 30', a single PNP type control transistor $Q_5$, and a base resistor 52. The rectifiers 50, 51 provide full wave rectification of the voltage across the current sensing resistor 30'. This rectified voltage is applied to the emitter-base path of the transistor $Q_5$. The conduction of the control transistor $Q_5$ is controlled by the voltage across the current sensing resistor 30' so as to vary the impedance of the control circuit (and hence the base current of the transistors $Q_1$ and $Q_2$) accordingly. The circuit modification of FIGURE 3 reduces the number of control transistors from two to one, but requires two diode rectifiers.

It will thus be seen that the invention provides an improved control circuit for controlling the amount of base current supplied to inverter transistors as a function of load current. While the invention shows specific embodiments for sensing the load current and effecting control, it will be appreciated that other embodiments may be utilized. For example, if the control circuit needs to be isolated from the output circuit, the load current may be sensed by a current transformer having its primary winding connected in series with one of the output lines and having its secondary winding connected in place of the sensing resistors 30, 30' in the control circuit to provide the desired control. Or, a lamp may be connected in series with one of the output lines to provide a variable light output that controls a light sensitive device which, in turn, controls the base current of the inverter transistors. Persons skilled in the art will appreciate that NPN type transistors or other semiconductor devices may be used with appropriate circuit, voltage, and polarity modifications. And other relay configurations, such as operating the contacts RC-1 and RC-2 directly from the winding RB, or using only the relay RA and contacts RA-1, may be used, either with or without the continuous control. And various sequences of relay operation may also be used. The continuous control may be used without relays also. Therefore, while the invention has been described with reference to particular embodiments, it is to be understood that modifications may be made without departing from the spirit of the invention or from the scope of the claims.

What I claim as new and desire to secure by Letters Patent of the United States is:

1. An inverter for changing direct current provided at a pair of source terminals to alternating current at load terminals comprising: a transformer having a magnetic core, a primary winding with a tap and a feedback winding with a tap coupled to said core; a secondary winding; first and second transistors each having an emitter, a base, and a collector; first means for connecting the emitter-collector paths of said transistors between said tap of said primary winding and respective points on said primary winding spaced from said primary winding tap; means for connecting said source terminals in series with said first means; (second means) for connecting the emitter-base paths of said transistors between said tap of said feedback winding and respective points on said feedback winding spaced from said feedback winding tap; means for coupling said load terminals to said transformer for supplying said alternating current; a current limiting resistor connected in series between said feedback winding tap and said emitter-base paths of said transistors with one end of said current limiting resistor connected directly to said feedback winding tap, a current sensing resistor and at least one semiconductor device connected in parallel with said current limiting resistor and in series between said feedback winding tap and said emitter-base paths of said transistors, with said current sensing resistor also being connected in series with a load terminal and the secondary winding for sensing the level of said alternating current.

2. The inverter of claim 1 including a second current limiting resistor in a parallel circuit with said current limiting resistor, a normally-open switch in said parallel circuit and a current responsive means operatively connected to said switch and in series between a load terminal and the secondary winding for closing said switch in response to a predetermined level of alternating current.

3. The inverter of claim 1 wherein said at least one semiconductor device includes a pair of transistors, said current sensing resistor being connected in series with the emitter-base paths of the pair of transistors, and the emitter-collector paths of the pair of transistors being connected in parallel.

4. The inverter of claim 1 including a relay winding connected to said coupling means and responsive to a predetermined level of alternating current therein, said relay winding having a set of associated contacts, a fixed resistor connected in series circuit with said contacts, with said series circuit being connected in parallel with said current limiting resistor.

5. The inverter of claim 1 wherein said coupling means comprises an output winding coupled to said transformer and having a plurality of selectable taps for connection to said load terminals, and a relay winding connected between said secondary winding and one of said load terminals, and relay contacts associated with said relay winding and connected between said selectable taps and the other of said load terminals for supplying a variable output voltage in response to energization and de-energization of said relay winding.

6. An inverter circuit comprising first and second transistors each having an emitter, a base, and a collector, a transformer having a magnetic core and a primary winding and a feedback winding coupled thereto, with said collectors being connected to said primary winding and a source of direct current coupled together so that conduction of one transistor causes said feedback winding to produce voltage applied to said transistor bases that aid conduction of said one transistor and oppose conduction of the other transistor and so that said core reverses magnetically after said one transistor conducts for a predetermined amount of volts-seconds and causes said feedback winding to switch the states of said transistors, means coupled to said transformer for deriving alternating current therefrom, means coupled to said alternating current deriving means for producing a signal that varies as a function of said alternating current, an electron current control device having a main current path and control electrodes, means connecting said main current path in series with the base-emitter paths of said transistors and connecting said control electrodes to said signal producing means for controlling the base current supplied to said transistors by said feedback winding as a function of the alternating current in said alternating current deriving means, first and second fixed resistors connected in parallel circuit with said feedback winding and the emitter-base paths of said transistors, the parallel circuit of said second fixed resistor being normally open, and means coupled to said alternating current driving means for closing the circuit of said second fixed resistor in response to a predetermined level of said alternating current.

References Cited
UNITED STATES PATENTS

| | | | |
|---|---|---|---|
| 2,950,446 | 8/1960 | Humez et al. | 331—113 |
| 2,959,745 | 11/1960 | Grieg | 331—113 |
| 2,968,738 | 1/1961 | Pintell | 331—113 |
| 3,004,206 | 10/1961 | Sheffet | 331—113 |
| 3,040,271 | 6/1962 | Murphy et al. | 331—113 |
| 3,048,764 | 8/1962 | Murphy | 331—113 |

ROY LAKE, *Primary Examiner.*

JOHN KOMINSKI, *Examiner.*